3 Sheets--Sheet 3.
N. H. THOMPSON.
Electrical Apparatus for Ships' Registers.
No. 146,490. Patented Jan. 13, 1874.
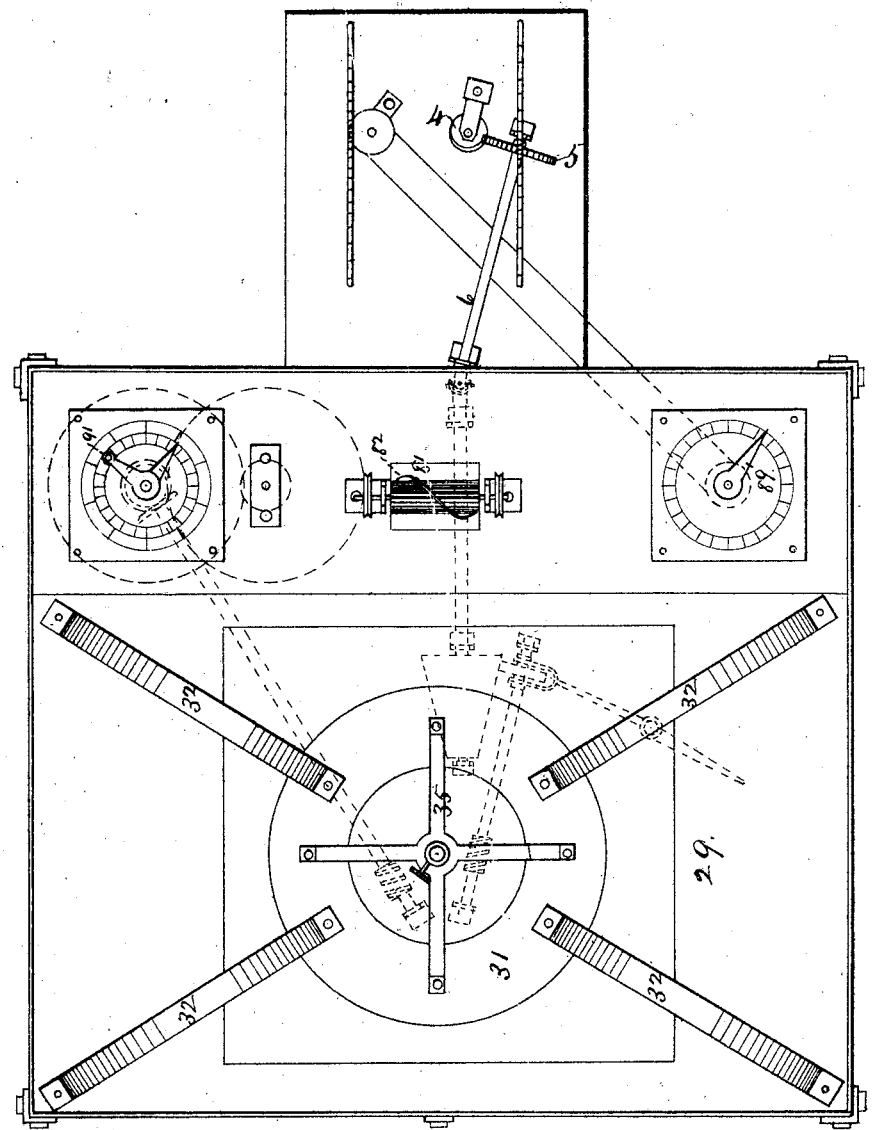
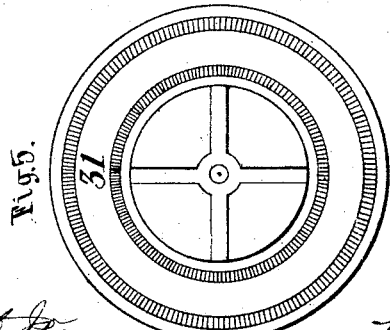

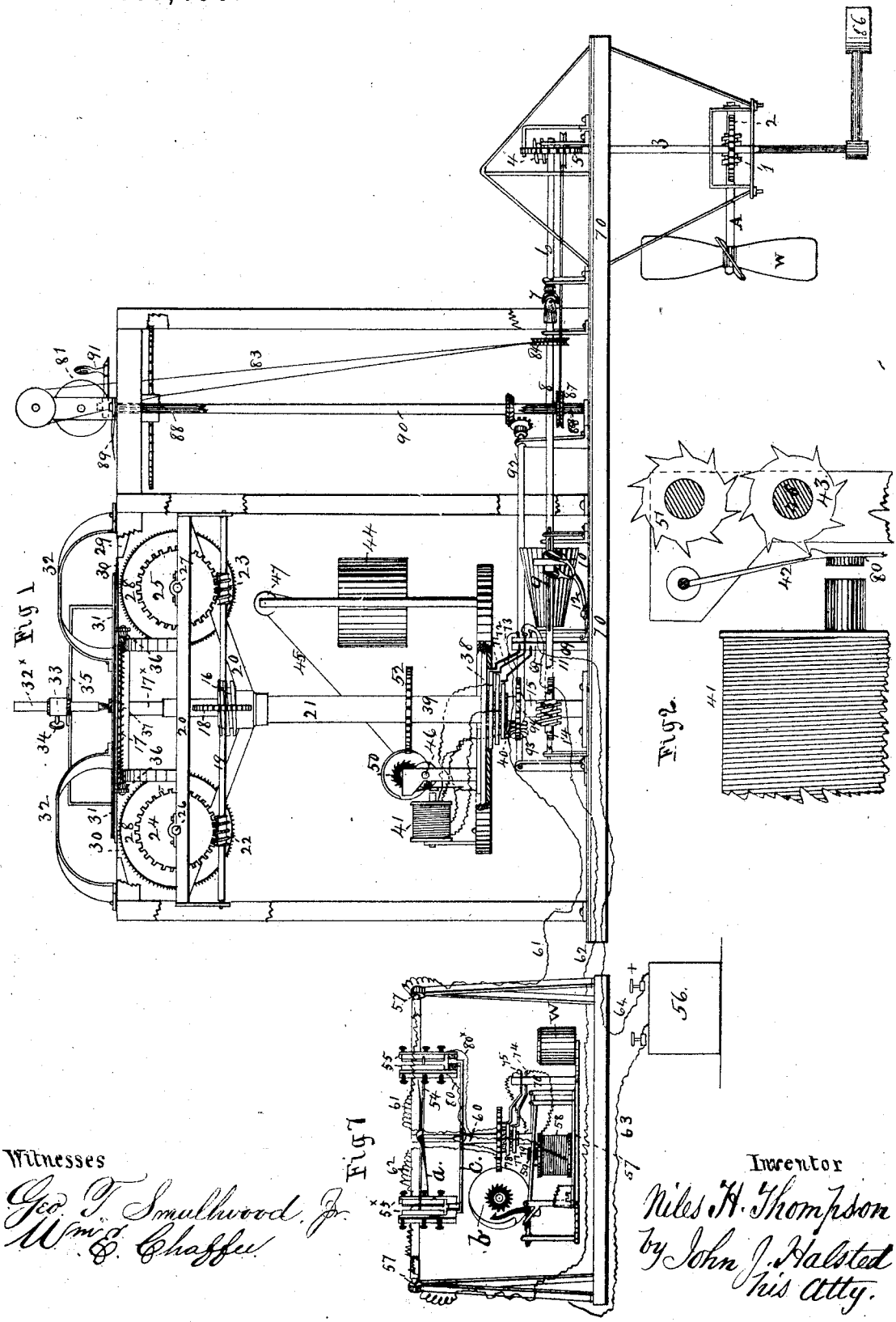
N. H. THOMPSON.
Electrical Apparatus for Ships' Registers.
No. 146,490. Patented Jan. 13, 1874.

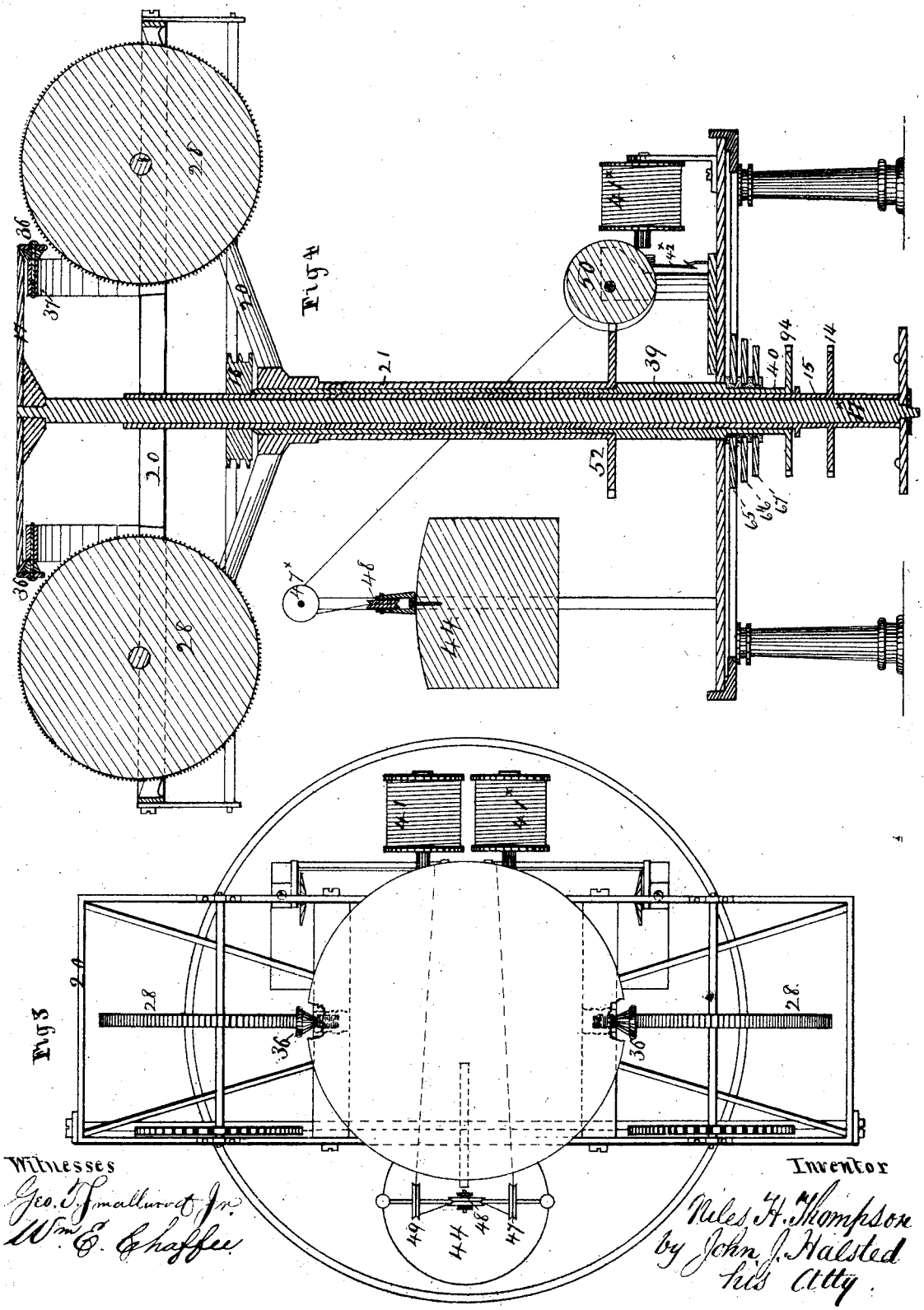

UNITED STATES PATENT OFFICE.

NILES H. THOMPSON, OF ALBION, MICHIGAN.

IMPROVEMENT IN ELECTRICAL APPARATUS FOR SHIPS' REGISTERS.

Specification forming part of Letters Patent No. 146,490, dated January 13, 1874; application filed December 24, 1873.

*To all whom it may concern:*

Be it known that I, NILES HIBBARD THOMPSON, of Albion, Michigan, have invented an Instrument for Automatically Registering or Marking the Course of a Ship or Vessel at Sea, of which the following is a specification:

My invention is designed to register or mark the course of a ship or vessel at sea on a chart or map of the sea. It consists of, first, a screw-wheel, or its equivalent, projected into the water from, and put in action by the progressive movement of, a ship or vessel, and having a suitable mechanism attached thereto, by means of which a chart or map of the sea is moved under the point of a pencil, which makes a mark upon it in a single direction, and with a velocity proportioned to that of the vessel; which mechanism is combined with, second, a suitable electro-magnetic apparatus attached to a compass, by means of which any change in the relative position of the needle, caused by a change in the direction in which the vessel is headed, is communicated to the mechanism moving the chart, in such a way as to change the direction in which the chart is moved to correspond to the direction in which the vessel is headed. I regard this as the leading element of my invention. The instrument may be placed in any convenient part of the vessel, and the screw water-wheel preferably but not necessarily, at or near the stern of the vessel.

I will first describe the screw water-wheel and its connection, next the mechanism moving the chart, and next the compass apparatus, and, finally, some auxiliary appliances, referring to the accompanying figures, forming part of this specification, in which—

Figure 1 is an elevation, showing the screw water-wheel, and the chart-moving mechanism and marking devices; Fig. 2, a detail, enlarged; Fig. 3, an enlarged plan of the chart-moving apparatus; Fig. 4, a vertical central section of the same; Fig. 5, an under-side or bottom view of the pressure-ring; Fig. 6, a plan of Fig. 1, and Fig. 7 an elevation of the compass apparatus.

The screw water-wheel shaft A, journaled in any appropriate support, has a worm, 1, gearing with a toothed wheel, 2, on a vertical shaft, 3, a worm, 4, on which actuates the gear 5 of the shaft 6, which latter is preferably connected by a universal or hinged joint, 7, so as to admit of any convenient position of the parts just described in relation to the shaft 8. In some cases the shafts 6 and 8 may be in line or integral.

The periphery of the cone 9 bears against the edge of an adjustable slide-wheel, 10, which is keyed or splined to a worm-shaft, 11, the slide-wheel having a yoked lever-arm, 12, connected with it, whereby the wheel may have its position changed at will, for the purpose of varying the proportion of the movement of the chart to the progressive movement of the vessel, to obtain the required adjustment. The worm 13 on shaft 11 gears with the gear 14 on a vertical hollow shaft, 15, on which, near its top, is another worm, 16. This hollow shaft surrounds and is supported by a stationary post, 17*, which extends from a fixed support or bed-plate, and has at its top a horizontal circular plate or disk, 17, hereafter described. The worm 16 gears and actuates a geared wheel, 18, on a horizontal shaft, 19, which is supported in proper bearings in a frame, 20, this frame being supported upon a hollow shaft, 21, which surrounds the hollow shaft 15. Upon this shaft 19, and at equal distances from its gear 18, are two worms, 22 and 23, which severally engage with the gears 24 and 25 upon the cross-shafts 26 27, mounted in bearings in the same frame 20; and each of these cross-shafts 26 27 has thereon a wheel, 28, provided with sharp, fine teeth on their peripheries, these teeth being for the purpose of feeding the chart in a radial direction from the pencil-point, considering the pencil-point as the center of an imaginary circle.

The top of the table or chart-supporting bed 29 has a circular portion, 30, cut out of its center, and when the chart is laid upon the table it is supported in part by the table, and in part by the circular plate 17, which occupies the center of the opening 30, thus leaving an annular opening around such plate, over which is an annular yielding pressure ring or band, 31, held by supports 32, affixed to the table. These devices, while holding the chart upon the feed-wheels, yet permit its being moved in the required direction, (by devices to be described,) so that it may receive from the adjustable pencil 32*, which is held by the sleeve 33 and set-screw 34 on the bracket or frame 35, which is screwed to the ring 31, the mark designed. The under side of the pressure-ring 31 is provided with one or more circles of fine teeth, arranged radially; and the teeth on the periphery of each of the wheels 28 are made with an inclination, like ratchet-teeth, these teeth being in a direction which is transverse to the direction of those on the ring. Small miter-wheels 36, having their bearings in the frame 20, and each having teeth on its periphery, in addition to its mitered ones, engage, by the miter-teeth, with the corresponding miter-teeth 37, radially arranged on the under side of the circular plate 17, close to its edge, the edge teeth engaging with the under surface of the chart. These small wheels, assisted by the teeth on the under side of the pressure-ring 31, serve to prevent the chart from being turned around the center or marking point by the movement of the wheels 28 around such center. The chart to be used is to be made on the globe plan.

By the operation of the mechanism above described, which is actuated by the rotation of the screw water-wheel $w$, the chart is moved in a single direction only, receiving a mark upon it in a straight line. The direction of the movement of the chart is varied to correspond to the changing course of the vessel by the apparatus hereinafter described.

The rotary table 38 has a short sleeve, 39, projecting above it, and another projecting below it, 40, and carrying a gear-wheel, 94. These sleeves surround the tubular shaft 15. The table supports uprights, on which are mounted two electro-magnetic coils, 41 and $41^\times$, each of which is adapted to actuate a pawl, 42 or $42^\times$, (see Fig. 2,) so as to withdraw it from engagement with the teeth of an eight-toothed wheel, 43 or $43^\times$, Fig. 2, to permit a weight, 44, suspended by a cord, 45, to descend. The cord passes from the shaft 46, on which it is wound, and on which is the wheel 43, over a guide-pulley, 47, thence to the pulley 48 on the weight, thence to another guide-pulley, 49, and thence to the corresponding shaft $46^\times$, on which it is wound in a direction the reverse of that on the other shaft 46. The worm 50 and its shaft are arranged to be turned, either in one or the other direction, by the action of one or the other of the eight-toothed wheels 43 or $43^\times$, which engage, respectively, with the ten-toothed wheels 51 or 51*, Fig. 2, on the worm-shaft. These four wheels are of equal diameters, and their teeth are so shaped, as seen in Fig. 2, that, while the rotation of either of the wheels 43 or 43* will actuate the wheels 51 or 51*, yet the rotation of either of the latter will not actuate either of the former; hence, although the worm 50 may be rotated in either direction, by the agency of either the one or the other of the wheels 43 or 43*, the rotation of such worm will not actuate either of the shafts 46 or 46*. The engagement of the worm 50 with the gear 52 on the hollow shaft causes it, when it turns, to rotate the frame 20 and its attachment to a greater or less extent, thus changing the position of the feed-wheels 28, so that they may carry the chart in a different direction, this change of direction being caused, as hereinafter stated, through the instrumentality of the compass and the electro-magnetic apparatus attached thereto. Beneath the table 38, (see Fig. 1,) and surrounding its hollow sleeve 40, are three rings, 65, 66, and 67, which are insulated by a rubber sleeve. An ivory post, 69, is erected on the bed-plate 70, and beneath table 38, in which are three slits to receive, respectively, springs 71, 72, and 73, which bear, respectively, on the three rings. The wire 64, from one pole of the battery, makes connection with the lowest spring 73, which bears upon the lowest ring. To the lowest of the rings is attached a wire, which passes upward through the other two rings and through the table, and then branches into two wires, sending a branch to each coil. These branches, after being severally coiled upon their respective spools, as seen, pass down through the table, one being attached to the upper ring 65, Fig. 4, and the other passing through such upper ring, and being then attached to the middle ring 66, Fig. 4. Now, upon the upper and middle rings, respectively, bear the upper and middle springs, which are supported on the ivory post 69, and to these springs are attached the wires 61 and 62, leading to the apparatus attached to the compass, forming the coils 58 and 58* thereon, and thence passing, respectively, to the springs 74 and 75, supported by the ivory post 76. These springs bear upon the rings 77 and 78, which are carried by, but insulated from, the shaft 60. To these rings are attached the wires 80 and $80^\times$, respectively, which pass up through the wheel Y, and thence to the upright arms 55, to which they are attached, forming a part of the apparatus attached to the compass, which I will now describe. It consists of a magnetic needle, $a$, to which is attached a conducting-rod, 54, the ends of which play between two pairs of upright arms, 55 and $55^\times$, and two electro-magnetic coils, 58 and 58*, operating a worm, $b$, which turns a hollow shaft, 60, to which the upright arms are attached by a bar, $c$. The conducting-rod 54 crosses the needle at a right angle, and is insulated from it by a rubber sleeve. The needle and its attachments are supported upon an appropriate swinging frame or gimbals 57, to maintain it in a horizontal position. The coils are also placed on this frame, the distance between them and the needle to be such that the latter will not be disturbed by their magnetic effect. They are connected by the wires 61 and 62, respectively, with the coils 41 and $41^\times$ on the registering-instrument, both sets of coils being connected with the battery (represented at 56) by the wires 63 and 64. They actuate the worm $b$ in opposite directions by means of pawls, to which their armatures are attached, which engage with ratchet-wheels on the shaft of the worm. The worm thus rotated turns the shaft 60 in the one or the other direction, accordingly as it is actuated by the one or the other coil. The upright arms, being attached to the said shaft, are carried with it in whichever direction it may rotate. One pair of the upright arms, viz., 55, is insulated from the bar, and each arm of this pair is connected by a wire, 80 or $80^\times$, with one of the coils. The other pair, viz., $55^\times$, is not insulated from the bar, and therefore makes connection through it and the shaft and frame with the wire 63, leading to the battery. One end of the conducting-rod 54 plays between the pair of upright arms 55, and the other end between the pair $55^\times$, so that when one end of the rod forms a contact with one of the pair of arms 55 the other end forms a contact with one of the other pair $55^\times$. The rod thus operates as a key to close and break the circuit of the battery through one or the other of the pair of arms 55, each one of the other pair $55^\times$ connecting indifferently with the battery. Each one of the arms 55 is connected by a wire with that one of the coils 58 or $58^\times$ which, actuating the worm $b$, and thus rotating the shaft 60, will carry it away from contact with the rod, and thus break the circuit. The circuit is closed, whenever the vessel changes the direction in which it is heading, by one or the other of each pair of upright arms 55 and $55^\times$ being brought into contact with each end, respectively, of the rod. The circuit thus formed will extend from one pole of the battery, through the wire 64, to one of the coils on the registering-instrument, (either 41 or $41^\times$;) then, through one of the wires 61 or 62, to one of the coils on the apparatus attached to the compass, (either 58 or $58^\times$;) then, through one of the wires 80 or $80^\times$, to one of the pair of arms 55; then, through the rod 54, to one of the pair of arms $55^\times$; then, through the frame and wire 63, to the other pole of the battery. The passage of the electric current through such circuit will at the same time actuate the worms $b$ and 50 by means of one or the other of the electro-magnets with which they are respectively connected, the rotation of the worm 50 shifting the position of the feed-wheels 28, so as to change the direction in which the chart is moved to correspond to the change in the direction in which the vessel is heading, and the rotation of the worm $b$ moving the upright arms away from the rod 54, thus breaking the circuit, and leaving the rod free to make another contact. By this means the direction in which the chart is being moved is changed from time to time as the vessel changes its course, and the pencil makes a mark upon it, representing the actual course which the vessel has taken, and showing its position at the time of observation. The wire 61 connects the coil 58 with the coil 41, and the wire 62 connects the coil $58^\times$ with the coil $41^\times$. The same current operates through both sets of coils at different times. Only one battery is employed.

The weight W on the compass-frame is simply a balancing-weight.

If the needle will not thereby be affected by the passage of the electric current through it, I propose to dispense with the conducting-rod 54 by placing the needle so that one of its ends will swing between the insulated upright arms 55, in which case the insulated upright arms 55* may also be dispensed with, the pivot on which the needle rests and the frame-work serving in such case to conduct the current to the wire 63, leading to the battery.

The compass and electro-magnetic apparatus attached thereto may be placed at any part of the vessel where it will be freest from disturbing conditions, and at any desirable distance from the registering mechanism, its connection with the latter being maintained by the conducting-wires 61 and 62; and I contemplate placing the said compass and apparatus in a box of a convenient size and shape, made of wood or other suitable material, which box, containing the said compass and apparatus, is to be placed in another larger box, the interspace to be filled with some fibrous material, such as cotton or hair, with a view to protecting the needle from any vibratory motion which might otherwise be communicated to it by the vessel.

There are three collateral devices which may be connected with my apparatus, and which I will now describe. First. A device for indicating the velocity per hour of the vessel. It consists of a clock-work (which needs no description) for slowly rotating a drum covered with paper, (see 81, Figs. 1 and 6,) and over this drum is placed a spiral blade, 82, of brass, upon a shaft, the edge of the spiral blade bearing upon the paper. The spiral blade is caused to rotate by means of a cord or belt, 83, passing over a pulley, 84, on shaft 8, and during its rotations the blade makes a series of legible marks across the paper. Second. A device for ascertaining the leeway of a vessel at sea. For this purpose I fix blades or wings 86 to a vertical shaft at an acute angle to each other, the wings being under water, a pulley on the shaft being connected, by a cord, with a pulley, 87, on the vertical shaft 88, the latter having thereon an index-hand, 89, placed above a dial divided into three hundred and sixty degrees and parts of degrees. The change of position of the wings turns the shafts, and, consequently, the index. The form of the wings compels them, as the vessel moves, to stand in a position corresponding to the direction of such movement, and if that direction differs from the direction in which the vessel is headed, the amount of that difference will be indicated by the index. This device may also serve to indicate a transverse current. Third. A device for adjusting the position of the feed-wheels 28 in order to correct the indications of the marking-instrument for the declination of the needle, for leeway, and for the action of currents. This is done by simply changing at will, and to the extent required, the position of the feed-wheels 29 by the following means: A vertical shaft, 90, having a handle, 91, and index-pointer, to be moved by hand, is connected by miter-gearing, as shown, (see Fig. 1,) to a horizontal shaft, 92, which, by means of a worm, 93, working into wheel 94, moves the shaft which carries the rotary table 38, thus carrying the table and all the apparatus supported by it, and also the shaft and frame-work which supports the feed-wheels 28, so that the direction of the feeding movement of the chart may be changed accordingly. The declination of the needle is to be ascertained from other sources, the device in this connection being designed merely to adjust for it when ascertained. It also serves to adjust for leeway and currents.

If desired, a clock-work may be connected with the horizontal shaft of this device, so that the indications of the whole marking apparatus may be adjusted for a continuously increasing or decreasing declination of the needle.

I claim—

1. The combination, with a magnetic needle, of an electrical circuit and circuit-closers, (the circuit-closers being arranged to indicate any deflection of the needle,) and devices operating to remove the circuit-closers from contact with the needle.

2. The combination, with a registering apparatus, of a magnetic needle and an electric circuit controlled by said needle, operating to convey any deflections of the needle to the registering apparatus, substantially as set forth.

NILES HIBBARD THOMPSON.

Witnesses:
 CHAS. W. BRADBURY,
 C. W. HELLEN.